United States Patent
Lin et al.

(10) Patent No.: US 10,936,124 B2
(45) Date of Patent: Mar. 2, 2021

(54) INTERACTIVE PROJECTION SYSTEM AND INTERACTIVE PROJECTION METHOD

(71) Applicants: Xiu-Yu Lin, Taipei (TW); Ting-Hsiang Lan, Taipei (TW); Chiao-Tsu Chiang, Taipei (TW); Ya-Fang Hsu, Taipei (TW)

(72) Inventors: Xiu-Yu Lin, Taipei (TW); Ting-Hsiang Lan, Taipei (TW); Chiao-Tsu Chiang, Taipei (TW); Ya-Fang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/417,655

(22) Filed: May 21, 2019

(65) Prior Publication Data
US 2019/0369806 A1 Dec. 5, 2019

Related U.S. Application Data

(60) Provisional application No. 62/674,580, filed on May 21, 2018.

(51) Int. Cl.
*G06F 3/042* (2006.01)
*G06T 11/20* (2006.01)

(52) U.S. Cl.
CPC .......... *G06F 3/0425* (2013.01); *G06T 11/203* (2013.01)

(58) Field of Classification Search
CPC .................................................. G06F 3/0425
See application file for complete search history.

(56) References Cited

U.S. PATENT DOCUMENTS

| 2011/0205341 A1* | 8/2011 | Wilson | G06F 3/011 348/51 |
| 2017/0182412 A1* | 6/2017 | Osawa | A63F 13/213 |

FOREIGN PATENT DOCUMENTS

| CN | 105245866 | 1/2016 |
| CN | 106897688 | 6/2017 |

OTHER PUBLICATIONS

"Office Action of Taiwan Counterpart Application", dated May 27, 2020, p. 1-p. 8.

* cited by examiner

*Primary Examiner* — Gustavo Polo
(74) *Attorney, Agent, or Firm* — JCIPRNET

(57) ABSTRACT

An interactive projection system and an interactive projection method are provided. The interactive projection method includes: generating a virtual image by using a projector; detecting an object on the virtual image by using a depth camera, wherein the object corresponds to a virtual scene; detecting a drawing operation corresponding to the virtual image by using the depth camera; and projecting the virtual scene on the virtual image in response to the object being placed on the virtual image, and generating a block on the virtual image according to the drawing operation.

26 Claims, 18 Drawing Sheets

INTERACTIVE PROJECTION SYSTEM AND INTERACTIVE PROJECTION METHOD

CROSS REFERENCE TO RELATED APPLICATION

This application claims the priority benefit of U.S. provisional application Ser. No. 62/674,580, filed on May 21, 2018. The entirety of the above-mentioned patent application is hereby incorporated by reference herein and made a part of specification.

BACKGROUND

Technical Field

The invention relates to a projection system and a projection method, and more particularly, to an interactive projection system and an interactive projection method.

Description of Related Art

With the development of technology, interactive projectors that can interact with the user are becoming more and more common. The interactive projector may capture the action of the user, so that the user can interact with the virtual scene projected by the interactive projector. How to provide the user with a more diverse interactive experience through the interactive projector is one of the goals which those skilled in the art aim to achieve.

SUMMARY OF THE INVENTION

The invention provides an interactive projection system and an interactive projection method.

An interactive projection system of the invention includes an object and a projector. The object corresponds to a virtual scene. The projector includes a light source module, a projection lens module, a depth camera, a storage medium, and a processing module. The light source module provides an illumination beam. The projection lens module converts the illumination beam into an image beam and projects the image beam to generate a virtual image. The depth camera detects the object on the virtual image and a drawing operation corresponding to the virtual image. The processing module is coupled to the light source module, the projection lens module, the depth camera, and the storage medium. The processing module accesses the database in response to the object being placed on the virtual image and projects the virtual scene on the virtual image through the projection lens module, and the processing module generates a block on the virtual image according to the drawing operation.

In an embodiment of the invention, the processing module determines a line segment drawn by the drawing operation as a path in response to formation of an enclosed block by the line segment and an existing line segment on the virtual image, and the processing module generates the block according to the path.

In an embodiment of the invention, the processing module determines the enclosed block as the block based on an area of the enclosed block being larger than an area threshold value.

In an embodiment of the invention, the block includes a first region and a second region, the processing module selects a first position from the first region, and the processing module determines whether a first virtual facility can be placed at the first position.

In an embodiment of the invention, the processing module selects a second position different from the first position from the first region in response to the first virtual facility not being placeable at the first position, and the processing module determines whether the first virtual facility can be placed at the second position.

In an embodiment of the invention, the processing module places the first virtual facility in the second region in response to the first virtual facility not being placeable at the second position.

In an embodiment of the invention, the processing module selects a third position from the first region in response to the first virtual facility not being placeable at the second position, and the processing module determines whether a second virtual facility different from the first virtual facility can be placed at the third position.

In an embodiment of the invention, the processing module is configured to: obtain a circumscribed circle corresponding to the object on the virtual image; connect a center of the circumscribed circle to a plurality of vertices of the block to generate a plurality of tangent points of the circumscribed circle; obtain a plurality of tangent lines of the circumscribed circle respectively corresponding to the plurality of tangent points; and generate a plurality of enclosed regions including the first region by using the plurality of tangent lines and a plurality of edges of the block.

In an embodiment of the invention, the processing module is configured to: obtain a circumscribed circle corresponding to the object on the virtual image; connect a center of the circumscribed circle to a plurality of vertices of the block to generate a plurality of tangent points of the circumscribed circle; obtain a plurality of tangent lines of the circumscribed circle respectively corresponding to the plurality of tangent points; generate a plurality of enclosed regions including a first enclosed region by using the plurality of tangent lines and a plurality of edges of the block; and obtain a maximum circle in the first enclosed region as the first region.

In an embodiment of the invention, the processing module is configured to: obtain a circumscribed circle corresponding to the object on the virtual image; and obtain a circle as the first region. The first region is respectively tangent to the circumscribed circle, a first edge of the block, and a second edge of the block adjacent to the first edge.

In an embodiment of the invention, the processing module determines that the first virtual facility cannot be placed at the first position in the first region in response to presence of another virtual facility in the first region.

In an embodiment of the invention, the processing module determines that the first virtual facility cannot be placed at the first position in response to a projection image of the first virtual facility on the virtual image exceeding the first region when the first virtual facility is placed at the first position.

In an embodiment of the invention, the processing module randomly selects the first position from the first region.

In an embodiment of the invention, the processing module selects a geometric center of the first region as the first position.

An interactive projection method of the invention includes: generating a virtual image by using a projector; detecting an object on the virtual image by using a depth camera, wherein the object corresponds to a virtual scene; detecting a drawing operation corresponding to the virtual image by using the depth camera; and projecting the virtual scene on the virtual image in response to the object being placed on the virtual image, and generating a block on the virtual image according to the drawing operation.

In an embodiment of the invention, the interactive projection method further includes: detecting a drawing operation corresponding to the virtual image by using the depth camera; and generating a block on the virtual image according to the drawing operation.

In an embodiment of the invention, the interactive projection method further includes: determining a line segment drawn by the drawing operation as a path in response to formation of an enclosed block by the line segment and an existing line segment on the virtual image; and generating the block according to the path.

In an embodiment of the invention, the interactive projection method further includes: determining the enclosed block as the block based on an area of the enclosed block being larger than an area threshold value.

In an embodiment of the invention, the block includes a first region and a second region, and the interactive projection method further includes: selecting a first position from the first region; and determining whether a first virtual facility can be placed at the first position.

In an embodiment of the invention, the interactive projection method further includes: selecting a second position different from the first position from the first region in response to the first virtual facility not being placeable at the first position; and determining whether the first virtual facility can be placed at the second position.

In an embodiment of the invention, the interactive projection method further includes: placing the first virtual facility in the second region in response to the first virtual facility not being placeable at the second position.

In an embodiment of the invention, the interactive projection method further includes: selecting a third position from the first region in response to the first virtual facility not being placeable at the second position; and determining whether a second virtual facility different from the first virtual facility can be placed at the third position.

In an embodiment of the invention, the interactive projection method further includes: obtaining a circumscribed circle corresponding to the object on the virtual image; connecting a center of the circumscribed circle to a plurality of vertices of the block to generate a plurality of tangent points of the circumscribed circle; obtaining a plurality of tangent lines of the circumscribed circle respectively corresponding to the plurality of tangent points; and generating a plurality of enclosed regions including the first region by using the plurality of tangent lines and a plurality of edges of the block.

In an embodiment of the invention, the interactive projection method further includes: obtaining a circumscribed circle corresponding to the object on the virtual image; connecting a center of the circumscribed circle to a plurality of vertices of the block to generate a plurality of tangent points of the circumscribed circle; obtaining a plurality of tangent lines of the circumscribed circle respectively corresponding to the plurality of tangent points; generating a plurality of enclosed regions including a first enclosed region by using the plurality of tangent lines and a plurality of edges of the block; and obtaining a maximum circle in the first enclosed region as the first region.

In an embodiment of the invention, the interactive projection method further includes: obtaining a circumscribed circle corresponding to the object on the virtual image; and obtaining a circle as the first region. The first region is respectively tangent to the circumscribed circle, a first edge of the block, and a second edge of the block adjacent to the first edge.

In an embodiment of the invention, the interactive projection method further includes: determining that the first virtual facility cannot be placed at the first position in the first region in response to presence of another virtual facility in the first region.

In an embodiment of the invention, the interactive projection method further includes: determining that the first virtual facility cannot be placed at the first position in response to a projection image of the first virtual facility on the virtual image exceeding the first region when the first virtual facility is placed at the first position.

In an embodiment of the invention, the interactive projection method further includes:
randomly selecting the first position from the first region.

In an embodiment of the invention, the interactive projection method further includes: selecting a geometric center of the first region as the first position.

Based on the above, the interactive projection system of the invention can help the user quickly build a virtual scene having various virtual facilities. By using a plurality of objects respectively corresponding to different virtual scenes, the user can create a personalized virtual town on the virtual image. The interactive projection system may provide the user with a fun, life-relevant, and immersed user experience.

To make the aforementioned features and advantages more comprehensible, embodiments accompanied with drawings are described in detail as follows.

DESCRIPTION OF THE EMBODIMENTS

Figure 1A:
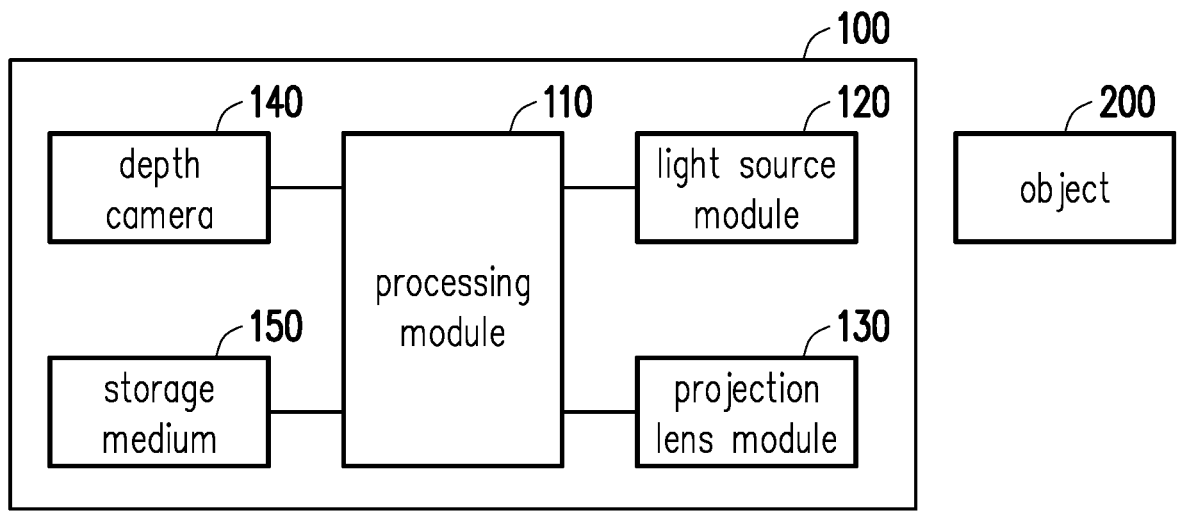
FIG. 1A is a functional block diagram showing an interactive projection system according to an embodiment of the invention.

To facilitate further understanding of the content of the invention, embodiments will be provided below as examples for implementing the invention accordingly. In addition, wherever possible, elements, components, and steps labeled with the same numerals in the drawings and embodiments represent the same or similar components.

Figure 1B:
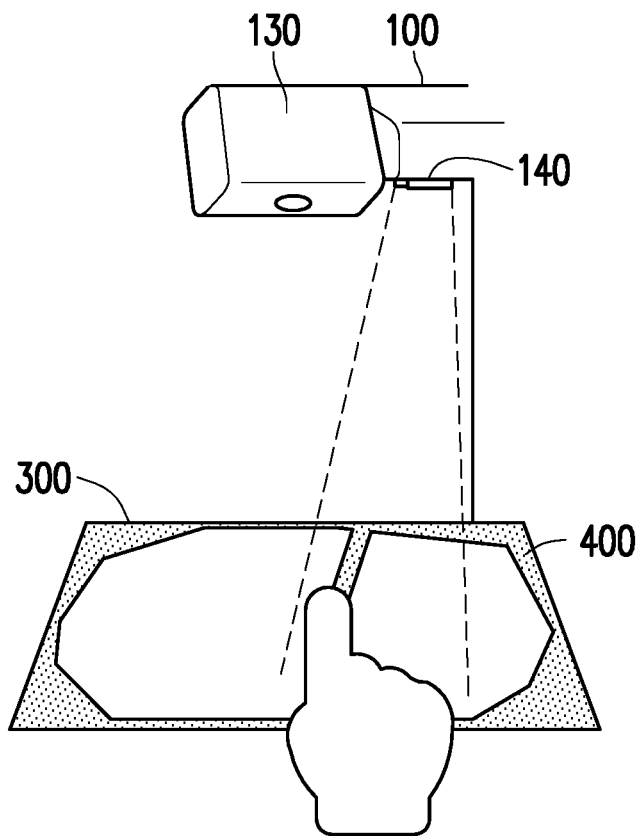
FIG. 1B is a schematic view showing generation of a virtual image by using a projector according to an embodiment of the invention.

FIG. 1A is a functional block diagram showing an interactive projection system 10 according to an embodiment of the invention. FIG. 1B is a schematic view showing generation of a virtual image 300 by using a projector 100 according to an embodiment of the invention. Referring to FIG. 1A and FIG. 1B, the interactive projection system 10 includes a projector 100 and an object 200. The projector 100 includes a processing module 110, a light source module 120, a projection lens module 130, a depth camera 140, and a storage medium 150.

The processing module 110 is coupled to the light source module 120, the projection lens module 130, the depth camera 140, and the storage medium 150. The processing module 110 is, for example, a central processing unit (CPU), another programmable general-purpose or specific-purpose micro control unit (MCU), microprocessor, digital signal processor (DSP), programmable controller, application specific integrated circuit (ASIC), graphics processing unit (GPU), arithmetic logic unit (ALU), another similar device, or a combination of the above devices.

The light source module 120 provides an illumination beam. The projection lens module 130 is controlled by the processing module 110 to convert the illumination beam from the light source module 120 into an image beam and project the image beam to a projection surface to generate the virtual image 300 including an edge 400. The processing module 110 may configure the light source module 120 and the projection lens module 130 to project various virtual scenes or virtual facilities on the virtual image 300.

The depth camera 140 is, for example, an infrared radiation (IR) camera, but the invention is not limited thereto. The depth camera 140 may measure the depth information of a captured image. In the present embodiment, the depth camera 140 is used to detect an object on the virtual image 300. For example, when the object 200 is placed on the virtual image 300, the depth camera 140 may detect the object 200, and the processing module 110 may recognize the object 200 through the appearance of the object 200. The depth camera 140 may be further used to detect a motion which interacts with the virtual image 300. For example, a user may perform a drawing operation on the virtual image 300 with a hand gesture or a paintbrush. The depth camera 140 may detect the drawing operation corresponding to the virtual image 300, and the processing module 110 may change the image beam projected by the projection lens module 130 according to the drawing operation, so that the user can interact with the virtual image 300 through the drawing operation.

The storage medium 150 is, for example, a fixed or movable random access memory (RAM), read-only memory (ROM), flash memory, hard disk drive (HDD), solid state drive (SSD) in any form, a similar device, or a combination of the above devices. In the present embodiment, the storage medium 150 stores a database associated with various virtual scenes.

The object 200 is, for example, a building block recognizable by the projector 100, but the invention is not limited thereto. The object 200 corresponds to a specific virtual scene. For example, the object 200 may correspond to a park scene, a school scene, a museum scene, or an amusement park scene, but the invention is not limited thereto. After the object 200 placed on the virtual image 300 is recognized by the processing module 110 through the depth camera 140, the processing module 110 may access the database in the storage medium 150 to retrieve relevant data of the virtual scene corresponding to the object 200, and the relevant data further include a virtual facility corresponding to the virtual scene.

Figure 2:
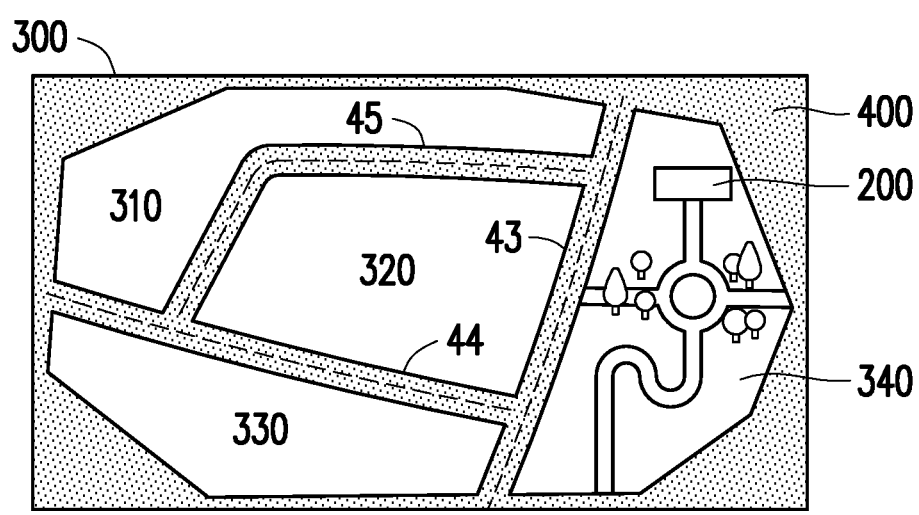
FIG. 2 is a schematic view showing paths and a virtual scene on the virtual image according to an embodiment of the invention.

FIG. 2 is a schematic view showing paths and a virtual scene on the virtual image 300 according to an embodiment of the invention. In the present embodiment, after the processing module 110 detects the drawing operation performed by the user on the virtual image 300 through the depth camera 140, the processing module 110 may generate one or more paths on the virtual image 300 according to the drawing operation, and the one or more paths may divide the virtual image 300 into one or more blocks. In other words, the processing module 110 may generate one or more blocks on the virtual image 300 according to the drawing operation. Referring to FIG. 2, assuming that the user draws a path 43, a path 44, and a path 45 on the virtual image 300 through a drawing operation, then the path 43, the path 44, and the path 45 may divide the virtual image 300 into a block 310, a block 320, a block 330, and a block 340.

The processing module 110 may access the database in the storage medium 150 in response to the object 200 being placed on the virtual image 300 to read the virtual scene corresponding to the object 200, and project the virtual scene on the virtual image 300 through the projection lens module 130. For example, after the processing module 110 generates the block 310, the block 320, the block 330, and the block 340 on the virtual image 300 according to the drawing operation of the user, the user may place the object 200 on the block 340. Through the depth camera 140, the processing module 110 of the projector 100 may recognize the object 200 as a building block corresponding to the park scene among the plurality of virtual scenes. Accordingly, the processing module 110 may access the database in the storage medium 150 to read the virtual scene and the virtual facility corresponding to the park scene, and project the virtual scene and the virtual facility corresponding to the park scene to the block 340. Specifically, the virtual facility is, for example, a virtual facility associated with the park scene, such as a slide, a swing, a seesaw, or a pavilion. Therefore, the user can quickly create sophisticated virtual scene and virtual facility on the virtual image 300 by simply placing the object 200 on the appropriate block (e.g., the block 340) on the virtual image 300.

The interactive projection system 10 of the invention can help the user quickly build a virtual scene having various virtual facilities. Compared with the general building block toys, the interactive projection system 10 not only can quickly create more types of more sophisticated virtual scenes and virtual facilities, but the interactive projection system 10 can also have more diverse interaction modes with the user.

For example, as shown in FIG. 2, after the projector 100 is turned on, the projector 100 may project the virtual image 300 on a table surface. The user may draw a plurality of different paths (e.g., the paths 43 to 45) on the virtual image 300 with a hand gesture to generate corresponding blocks (e.g., the blocks 310 to 340) according to the paths. When the user places an object (e.g., the object 200) on a block (e.g., the block 340), the projector 100 projects the virtual scene corresponding to the object onto the block. The user may determine the type of the virtual scene to be created on the block by selecting the appropriate object 200. For example, after the user places the object 200 (for example, the object 200 may be a pavilion-shaped object) corresponding to the park scene on the block 340, the projector 100 may project the park scene in the block 340 to correspond to the pavilion-shaped object 200. Next, the projector 100 may automatically generate virtual facilities (including a tree, a seesaw, a slide, etc.) associated with the park scene on the block 340 according to a predetermined rule.

The virtual scene and the virtual facility may both be randomly generated. Therefore, even if the user only has the object 200 corresponding to the park scene, the user may create park scenes of different appearances on the virtual image 300 through the object 200. If the user has a plurality of objects corresponding to different virtual scenes, the user may also create his/her own ideal town through these objects. For example, in addition to placing the object 200 corresponding to the park scene on the block 340, the user may also place an object (e.g., an object having a bell tower shape or an object having a flag-raising station shape) corresponding to the school scene on the block 320, and place an object (e.g., an apartment-shaped object) corresponding to the residence scene on the block 310 and the block 330. Accordingly, the user can create a residential area with a school at the center on the virtual image 300.

Figure 3:
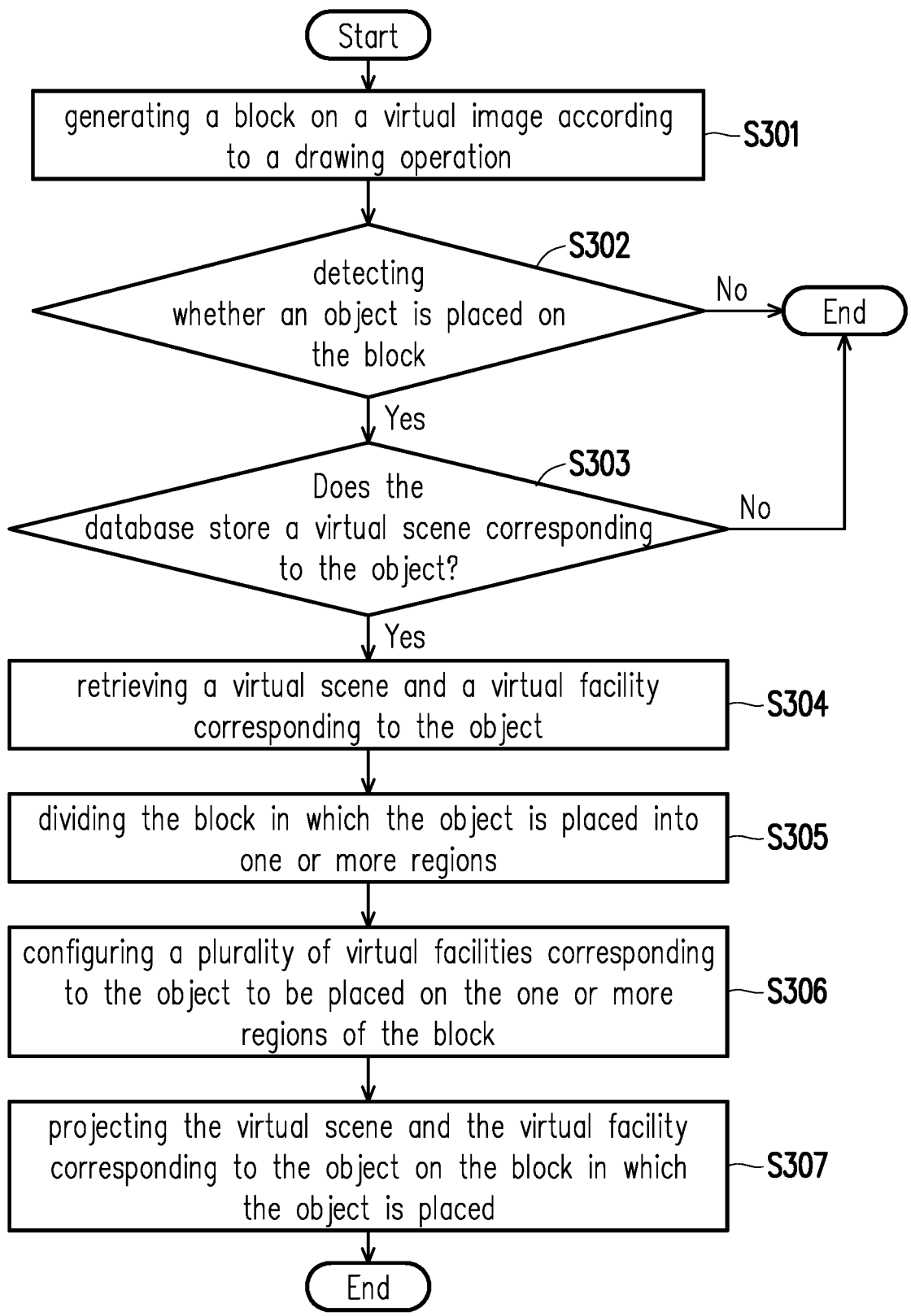
FIG. 3 is a flowchart showing an interactive projection method according to an embodiment of the invention.

FIG. 3 is a flowchart showing an interactive projection method according to an embodiment of the invention. The interactive projection method may be implemented by the interactive projection system 10 as shown in FIG. 1A. Referring to FIG. 1A, FIG. 1B, and FIG. 3, in step S301, the processing module 110 generates one or more blocks (e.g., the blocks 310, 320, 330, and 340 as shown in FIG. 2) on the virtual image 300 according to a drawing operation.

In step S302, the depth camera 140 detects whether the object 200 is placed on a block in the virtual image 300. If the depth camera 140 detects that the object 200 is placed on a block (hereinafter assuming that the object 200 is placed on the block 340 as shown in FIG. 2), proceeding to step S303. If the depth camera 140 does not detect that the object 200 is placed on any one of the blocks in the virtual image 300, the process of the interactive projection method is ended.

In step S303, the processing module 110 accesses the database in the storage medium 150 and determines whether the database stores a virtual scene corresponding to the object 200. If the database stores the virtual scene corresponding to the object 200, proceeding to step S304. If the database does not store the virtual scene corresponding to the object 200, it means that the projector 100 cannot interact with the object 200 currently placed on the virtual image 300, and the process of the interactive projection method is thus ended.

In step S304, the processing module 110 retrieves a virtual scene and a virtual facility corresponding to the object 200 from the database of the storage medium 150. For example, if the object 200 corresponds to a park, the virtual scene is, for example, a park scene, and the virtual facility is, for example, a virtual facility associated with the park scene, such as a slide, a swing, a seesaw, or a pavilion.

In step S305, the processing module 110 divides the block (e.g., the block 340 as shown in FIG. 2) in which the object 200 is placed into one or more regions. The purpose of this step is to divide one single block into a plurality of regions to distribute a plurality of virtual facilities corresponding to the object 200 to different regions in the block.

In step S306, the processing module 110 configures a plurality of virtual facilities corresponding to the object 200 to be placed on the one or more regions of the block 340.

In step S307, through the projection lens module 130, the processing module 110 projects the virtual scene and the virtual facility corresponding to the object 200 on the block in which the object 200 is placed. For example, the block is the block 340 on the virtual image 300 as shown in FIG. 2.

Figure 4A:
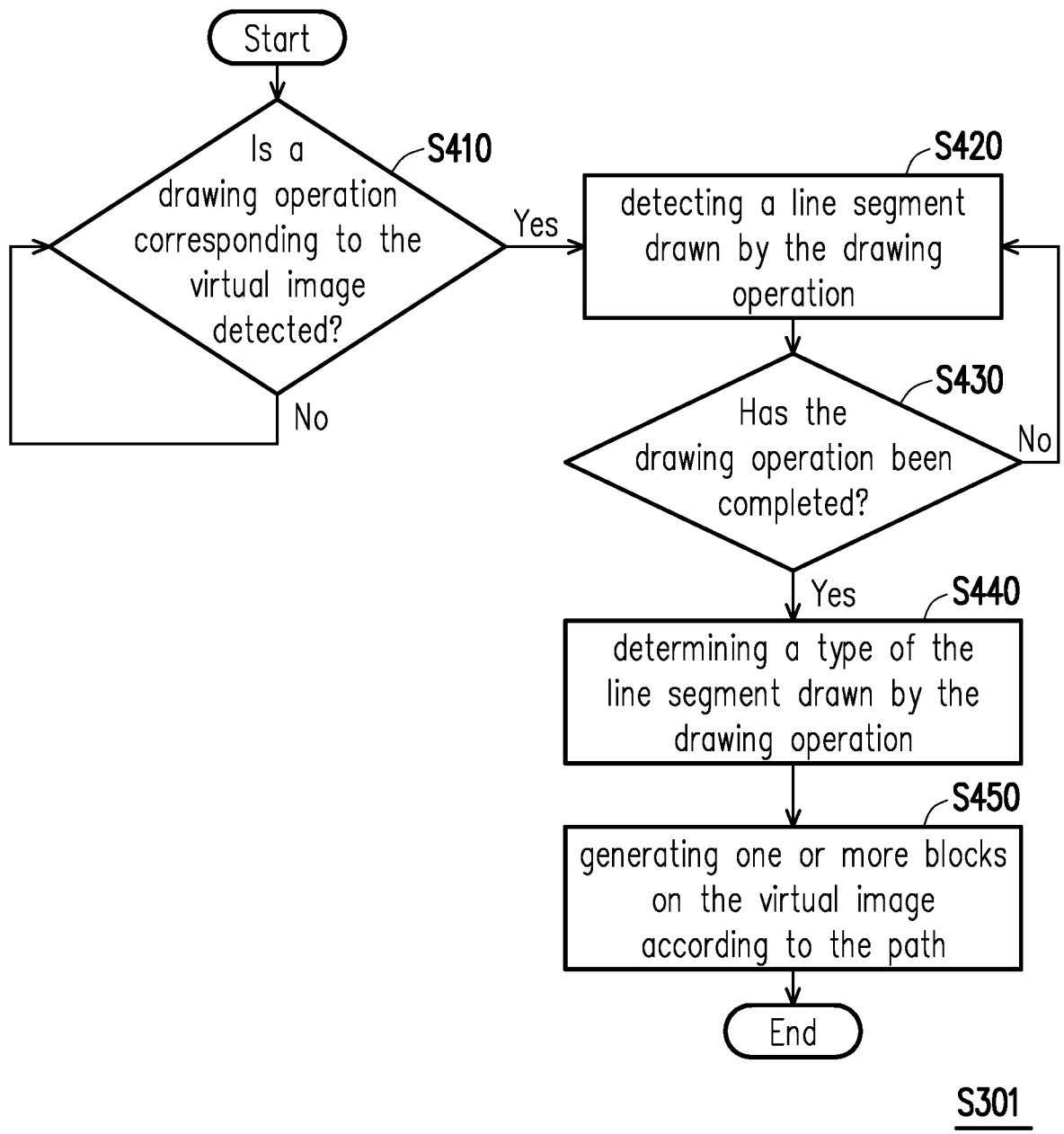
FIG. 4A is a flowchart showing a step shown in FIG. 3 according to an embodiment of the invention.

FIG. 4A is a flowchart showing step S301 shown in FIG. 3 according to an embodiment of the invention. In other words, FIG. 4A is a flowchart showing the step of generating one or more blocks on the virtual image 300 according to the drawing operation. In step S410, the processing module 110 determines whether the depth camera 140 detects a drawing operation corresponding to the virtual image 300. If the depth camera 140 detects the drawing operation corresponding to the virtual image 300, proceeding to step S420. If the depth camera 140 does not detect the drawing operation corresponding to the virtual image 300, step S410 is performed again.

Figure 4B:
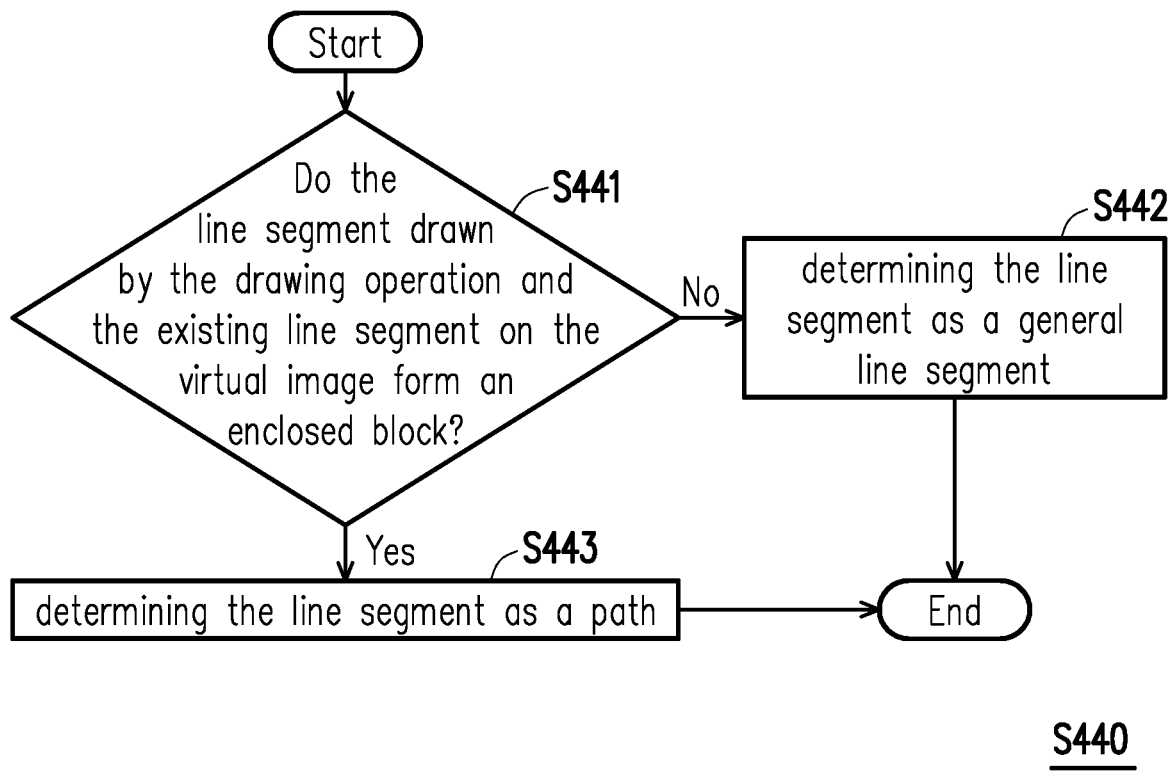
FIG. 4B is a flowchart showing a step shown in FIG. 4A according to an embodiment of the invention.
Figure 4C:
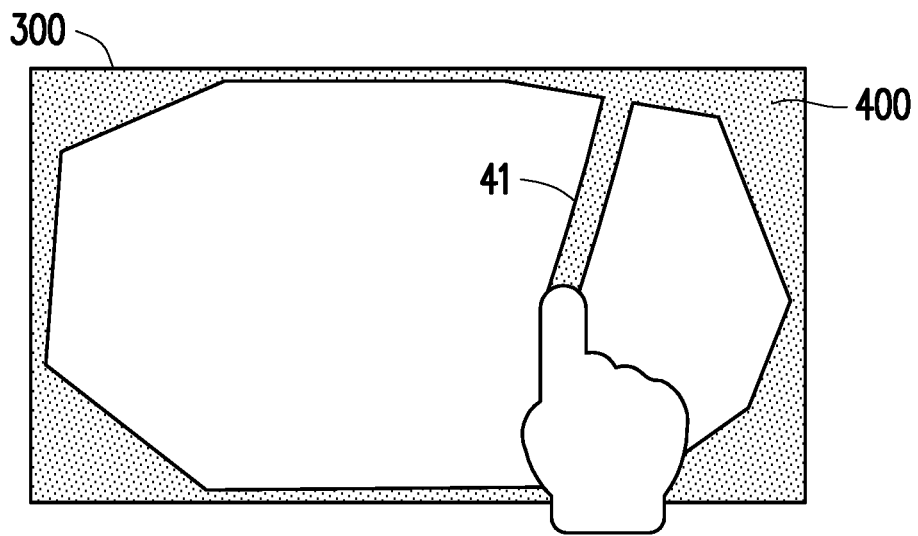
FIG. 4C is a schematic view showing detection of a line segment drawn by a drawing operation according to an embodiment of the invention.

In step S420, through the depth camera 140, the processing module 110 detects a line segment drawn by the drawing operation, as shown in FIG. 4C. FIG. 4C is a schematic view showing detection of a line segment drawn by the drawing operation according to an embodiment of the invention. In FIG. 4C, through the depth camera 140, the processing module 110 detects that the user is performing a drawing operation with a hand gesture to draw a line segment 41 on the virtual image 300.

Referring back to FIG. 4A, in step S430, the processing module 110 determines whether the drawing operation has been completed. For example, the processing module 110 may determine that the drawing operation has been completed in response to a stop time of the drawing operation exceeding a time threshold value (e.g., 2 seconds). If the drawing operation has been completed, proceeding to step S440. If the drawing operation has not been completed, returning to step S420 to continue to detect the line segment drawn by the drawing operation.

In step S440, the processing module 110 determines a type of the line segment drawn by the drawing operation. For example, the processing module 110 may determine that the line segment drawn by the drawing operation is an invalid line segment or the line segment can become a path on the virtual image 300. The processing module 110 may determine the line segment as a path based on an enclosed block formed by the line segment drawn by the drawing operation and an existing line segment on the virtual image 300, and the processing module 110 may generate one or more blocks on the virtual image 300 according to the path. The existing line segment is, for example, a path drawn by a previous drawing operation or the edge 400 of the virtual image 300.

Specifically, FIG. 4B is a flowchart showing step S440 shown in FIG. 4A according to an embodiment of the invention. In step S441, the processing module 110 determines whether the line segment drawn by the drawing operation and the existing line segment on the virtual image 300 form an enclosed block. If the line segment drawn by the drawing operation and the existing line segment on the virtual image 300 form an enclosed block, proceeding to step S443. If the line segment drawn by the drawing operation and the existing line segment on the virtual image 300 do not form an enclosed block, proceeding to step S442. In step S442, the processing module 110 determines the line segment drawn by the drawing operation as a general line segment instead of a path. The line segment that is determined as a general line segment will be canceled from the virtual image 300. In step S443, the processing module 110 determines the line segment drawn by the drawing operation as a path, and the path divides the virtual image 300 into one or more blocks. In other words, the user may create a path corresponding to the virtual scene on the virtual image 300 through a simple drawing operation. If the line segment drawn by the user and the existing line segment on the virtual image 300 do not form an enclosed block, the line segment is automatically cancelled. The user does not need to use an eraser-like function to eliminate the erroneously drawn line segment.

Figure 4D:
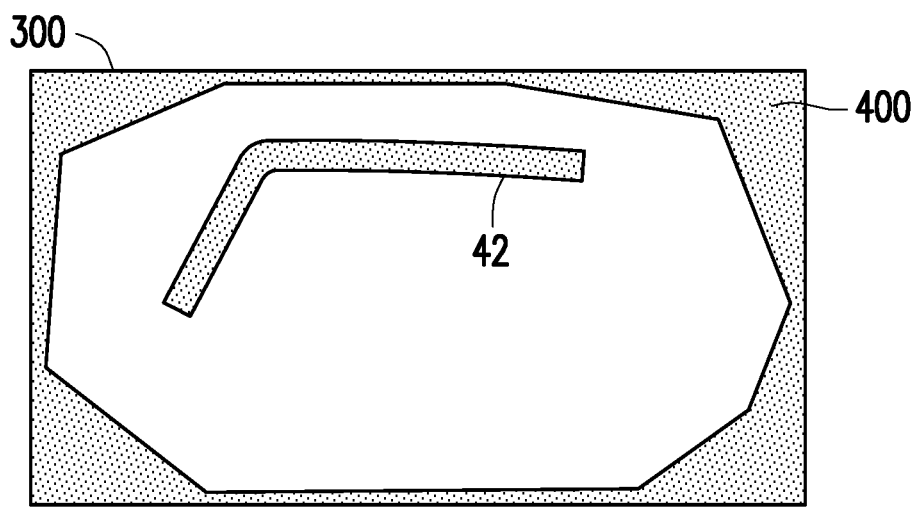
FIG. 4D, FIG. 4E, and FIG. 4F are schematic views showing types of line segments on the virtual image according to an embodiment of the invention.
Figure 4E:
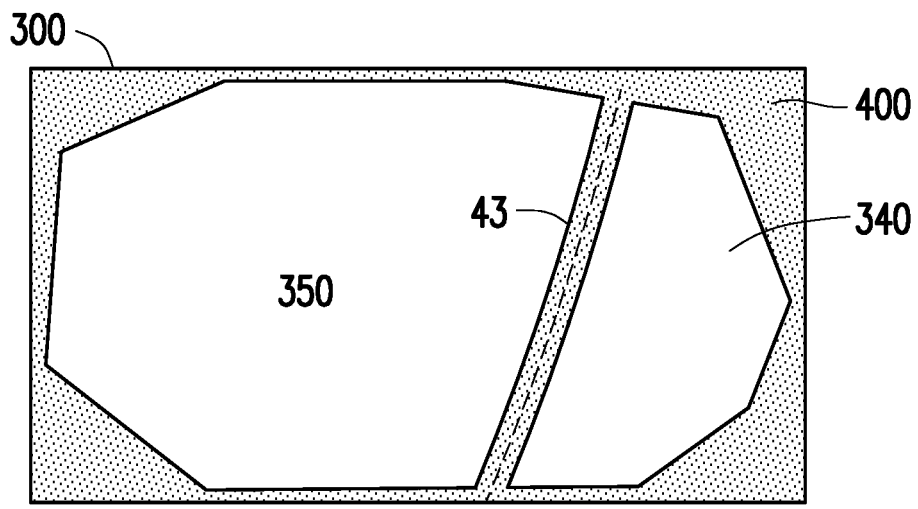
Figure 4F:
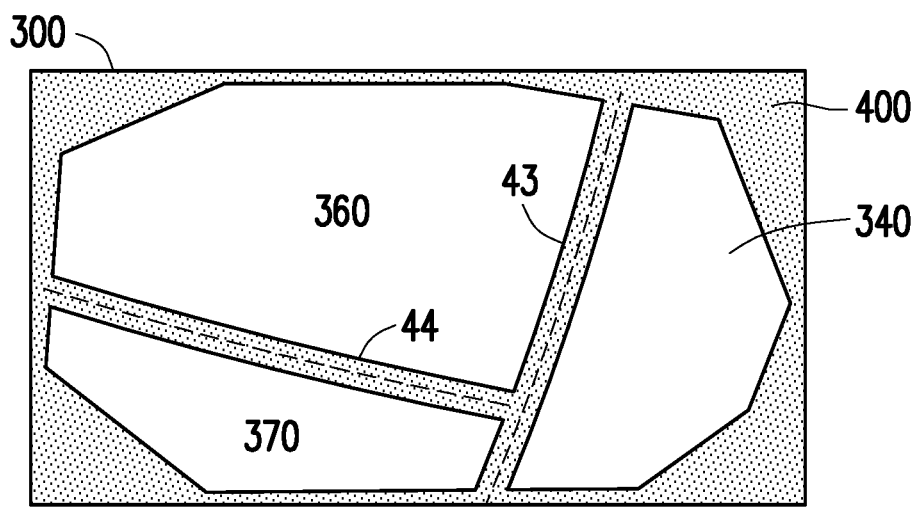

FIG. 4D, FIG. 4E, and FIG. 4F are schematic views showing types of line segments on the virtual image 300 according to an embodiment of the invention. In FIG. 4D, since a line segment 42 drawn by the drawing operation does not form any enclosed block with the existing line segment on the virtual image 300, the line segment 42 will be determined by the processing module 110 as a general line segment and thus cancelled. In FIG. 4E, since a line segment 43 drawn by the drawing operation can form two enclosed blocks (i.e., an enclosed block 340 and an enclosed block 350) with the edge 400 of the virtual image 300, the line segment 43 will be determined by the processing module 110 as a path. In FIG. 4F, since a line segment 44 drawn by the drawing operation can form two enclosed blocks (i.e., an enclosed block 360 and an enclosed block 370) with the line segment 43 determined as a path and the edge 400 of the virtual image 300, the line segment 44 will be determined by the processing module 110 as a path.

Referring back to FIG. 4A, in step S450, the processing module 110 generates one or more blocks on the virtual image 300 according to the path drawn by the drawing operation. Specifically, the processing module 110 may determine the enclosed block formed by the path and the existing line segment on the virtual image 300 as one or more blocks on the virtual image 300. For example, the processing module 110 may determine the enclosed blocks 340, 360, and 370 formed by the path 43, the path 44, and the edge 400 as shown in FIG. 4F as one or more blocks on the virtual image 300.

In some embodiments, the processing module 110 determines the enclosed block as one among the one or more blocks based on the area of the enclosed block being greater than an area threshold value. For example, assuming that the area of the enclosed block 370 as shown in FIG. 4F is less than or equal to a predetermined area threshold value, the processing module 110 will not determine the enclosed block 370 as a block on the virtual image 300. Assuming that the areas of the enclosed blocks 340 and 360 as shown in FIG. 4F are greater than the predetermined area threshold value, the processing module 110 will determine the enclosed blocks 340 and 360 as blocks on the virtual image 300.

Figure 5A:
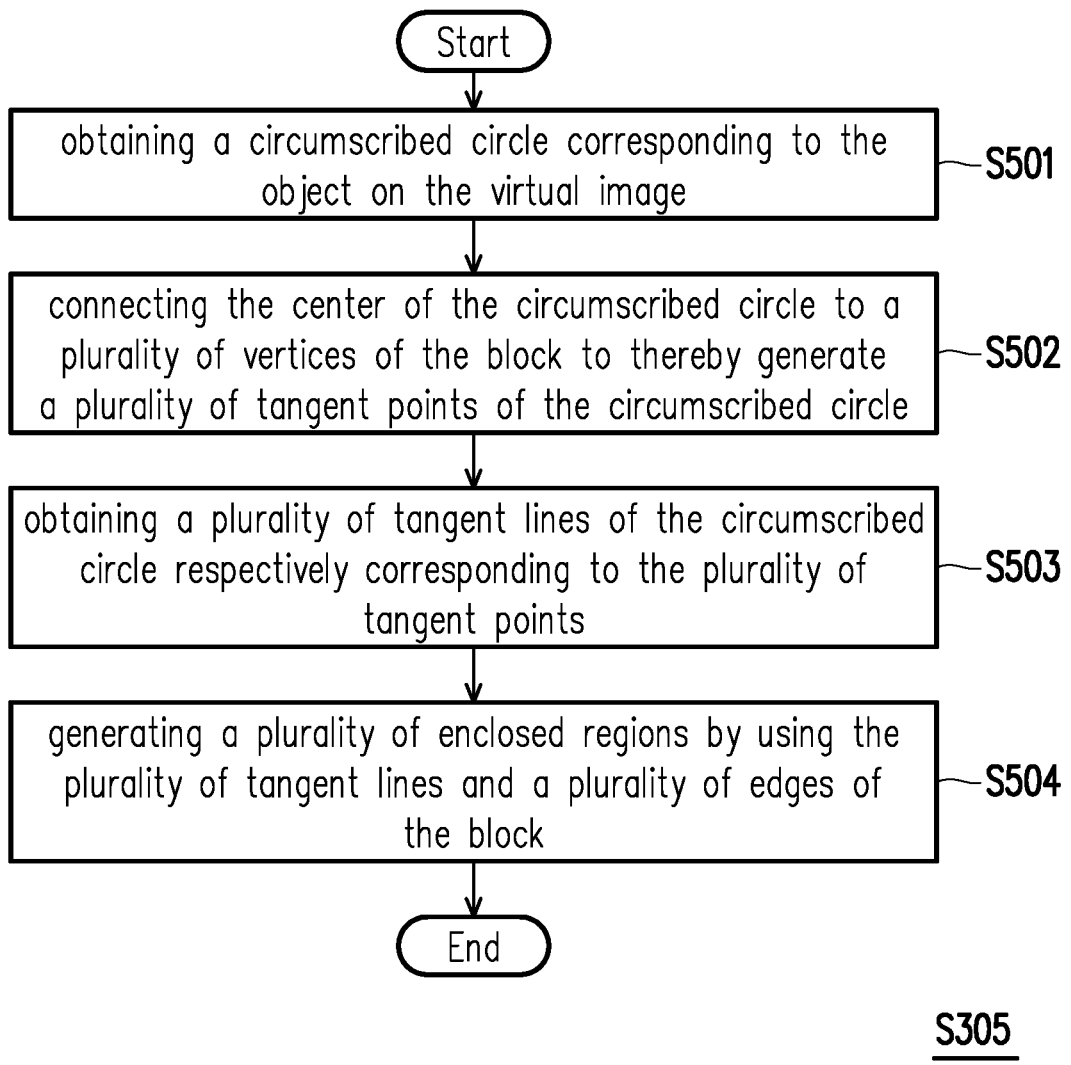
FIG. 5A is a flowchart further showing a step shown in FIG. 3 according to an embodiment of the invention.

FIG. 5A is a flowchart further showing step S305 shown in FIG. 3 according to an embodiment of the invention. In other words, FIG. 5A is a flowchart showing the step of dividing the block (e.g., the block 340 as shown in FIG. 2) in which the object 200 is placed into one or more regions.

In step S501, the processing module 110 obtains a circumscribed circle 250 corresponding to the object 200 on the virtual image 300 (or on the block 340). In step S502, the processing module 110 connects the center of the circumscribed circle 250 to a plurality of vertices of the block 340 in which the object 200 is placed to thereby generate a plurality of tangent points of the circumscribed circle 250. FIG. 5B is a schematic view showing generation of a plurality of tangent points of the circumscribed circle 250 corresponding to the object 200 according to an embodiment of the invention. Referring to FIG. 5A and FIG. 5B, after obtaining the circumscribed circle 250 corresponding to the object 200, the processing module 110 connects the center of the circumscribed circle 250 to each vertex of the block 340 to generate a plurality of tangent points respectively corresponding to each vertex, and the plurality of tangent points include a tangent point a, a tangent point b, a tangent point c, a tangent point d, a tangent point e, and a tangent point f.

Figure 5C:
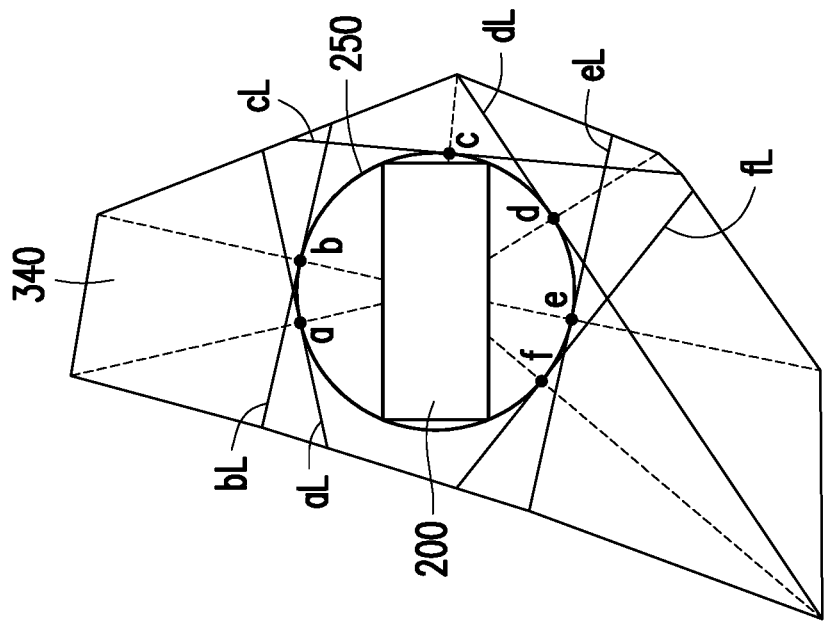
FIG. 5C is a schematic view showing generation of the plurality of tangent lines of the circumscribed circle corresponding to the object according to an embodiment of the invention.
Figure 5B:
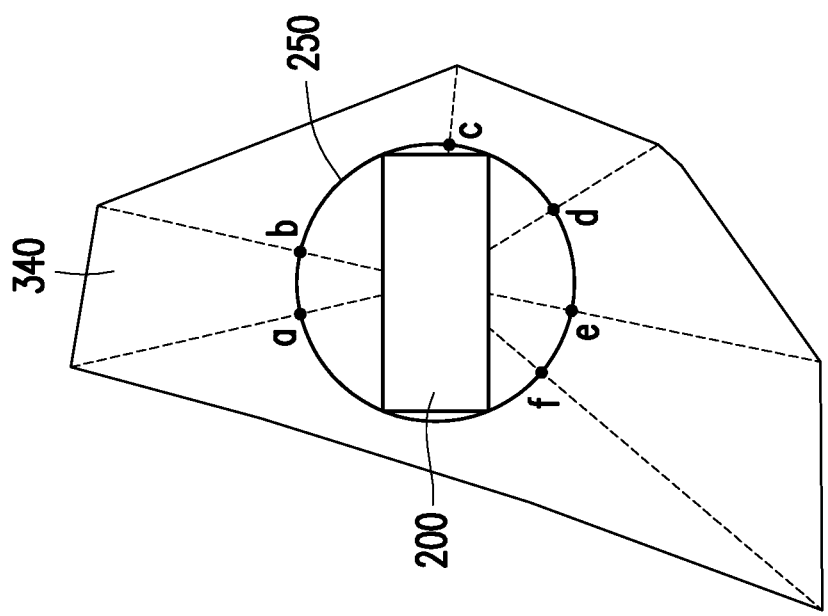
FIG. 5B is a schematic view showing generation of a plurality of tangent points of a circumscribed circle corresponding to an object according to an embodiment of the invention.

In step S503, the processing module 110 obtains a plurality of tangent lines of the circumscribed circle 250 respectively corresponding to the plurality of tangent points (i.e., the tangent point a, the tangent point b, the tangent point c, the tangent point d, the tangent point e, and the tangent point f), and the plurality of tangent lines include a tangent line aL corresponding to the tangent point a, a tangent line bL corresponding to the tangent point b, a tangent line cL corresponding to the tangent point c, a tangent line dL corresponding to the tangent point d, a tangent line eL corresponding to the tangent point e, and a tangent line fL corresponding to the tangent point f, as shown in FIG. 5C. FIG. 5C is a schematic view showing generation of the plurality of tangent lines aL, bL, cL, dL, eL, and fL of the circumscribed circle 250 corresponding to the object 200 according to an embodiment of the invention.

Figure 5D:
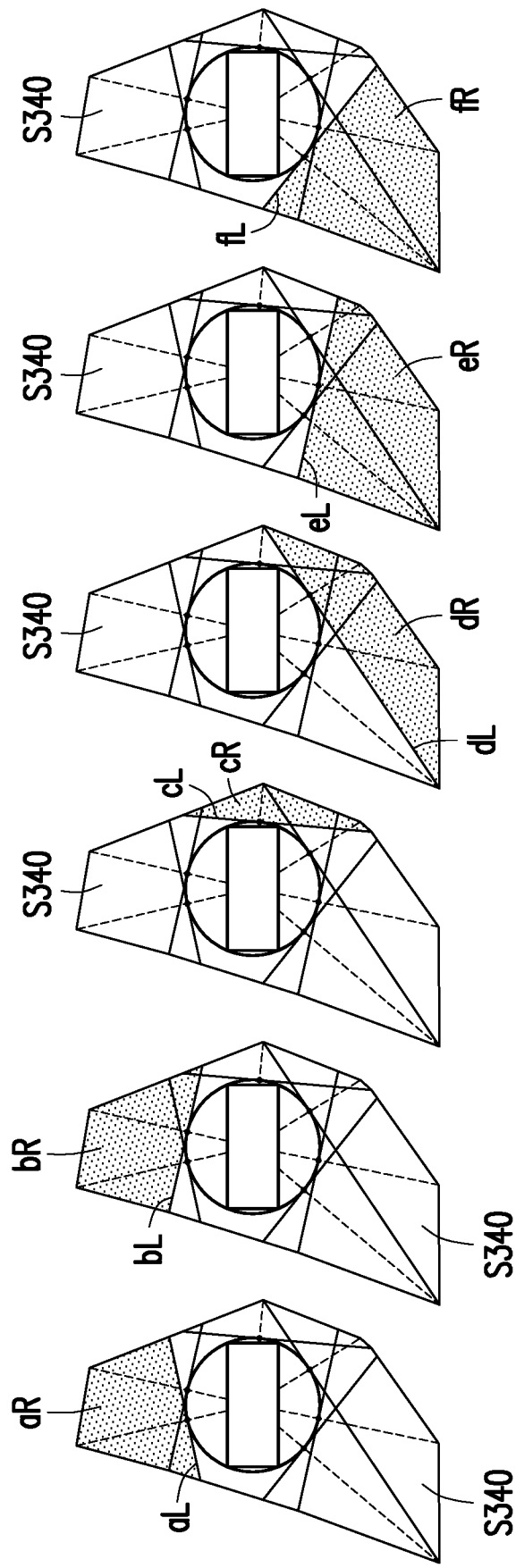
FIG. 5D is a schematic view showing a plurality of enclosed regions generated from the plurality of tangent lines according to an embodiment of the invention.

Referring back to FIG. 5A, in step S504, the processing module 110 generates a plurality of enclosed regions aR, bR, cR, dR, eR, and fR by using the plurality of tangent lines (i.e., the tangent line aL, the tangent line bL, the tangent line cL, the tangent line dL, the tangent line eL, and the tangent line fL) of the circumscribed circle 250 and a plurality of edges of the block 340, as shown in FIG. 5D. FIG. 5D is a schematic view showing the plurality of enclosed regions aR, bR, cR, dR, eR, and fR generated from the plurality of tangent lines aL, bL, cL, dL, eL, and fL according to an embodiment of the invention. For example, the processing module 110 may generate the enclosed region aR by using the tangent line aL and the three adjacent edges of the block 340. As another example, the processing module 110 may generate the enclosed region cL by using the tangent line cR and the two adjacent edges of the block 340. The plurality of enclosed regions described above may serve as one among the one or more regions mentioned in step S305 of FIG. 3.

Figure 6A:
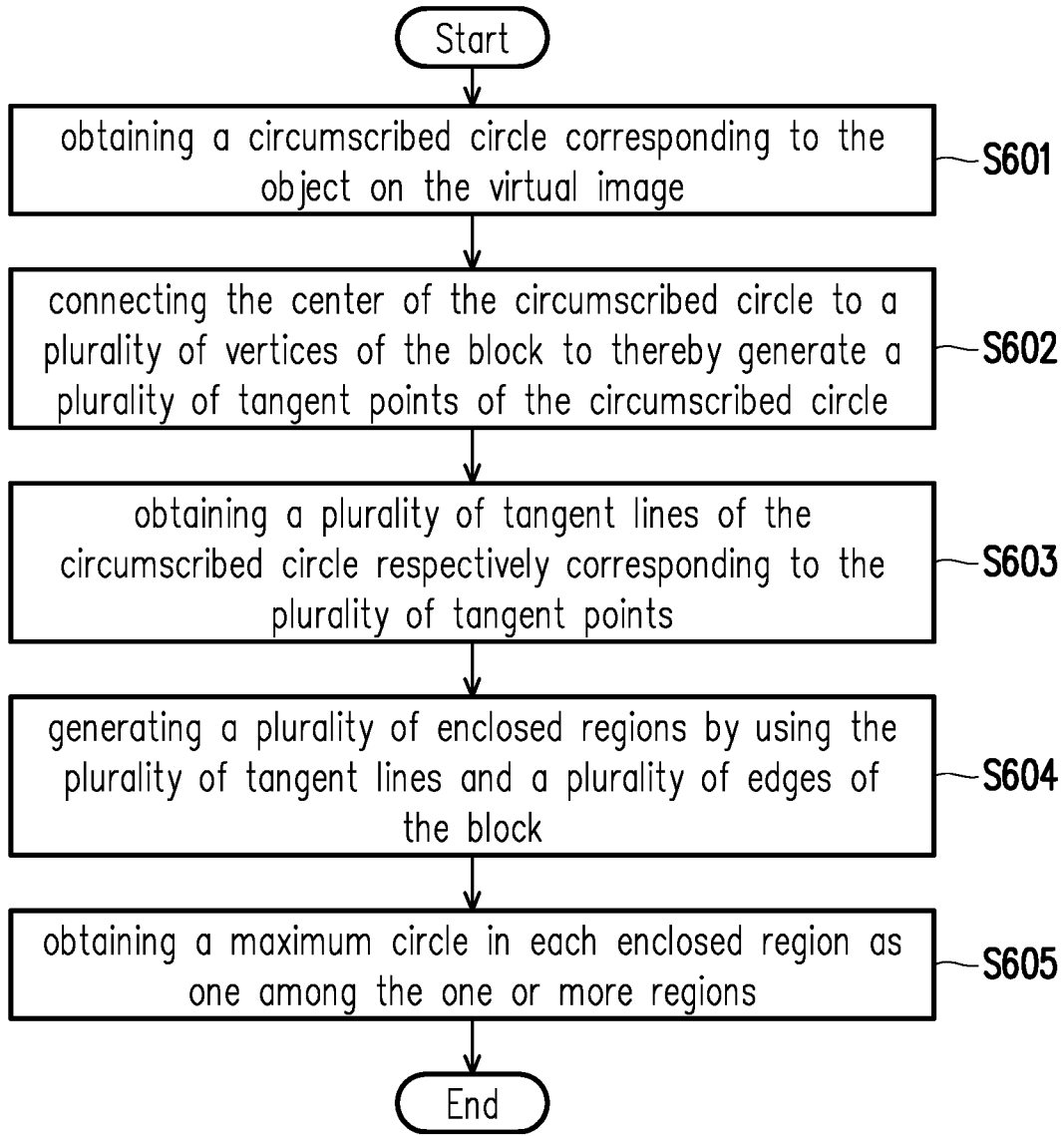
FIG. 6A is a flowchart further showing a step shown in FIG. 3 according to another embodiment of the invention.

FIG. 6A is a flowchart further showing step S305 shown in FIG. 3 according to another embodiment of the invention. In other words, FIG. 6A is a flowchart showing the step of dividing the block (e.g., the block 340 as shown in FIG. 2) in which the object 200 is placed into one or more regions. Step S601, step S602, step S603, and step S604 are respectively similar to step S501, step S502, step S503, and step S504 as shown in FIG. 5A. Therefore, sufficient teaching, suggestion, and implementation description for the details of step S601, step S602, step S603, and step S604 may be obtained according to the above description of the embodiment of FIG. 5A, which shall not be repeatedly described herein.

Figure 6B:
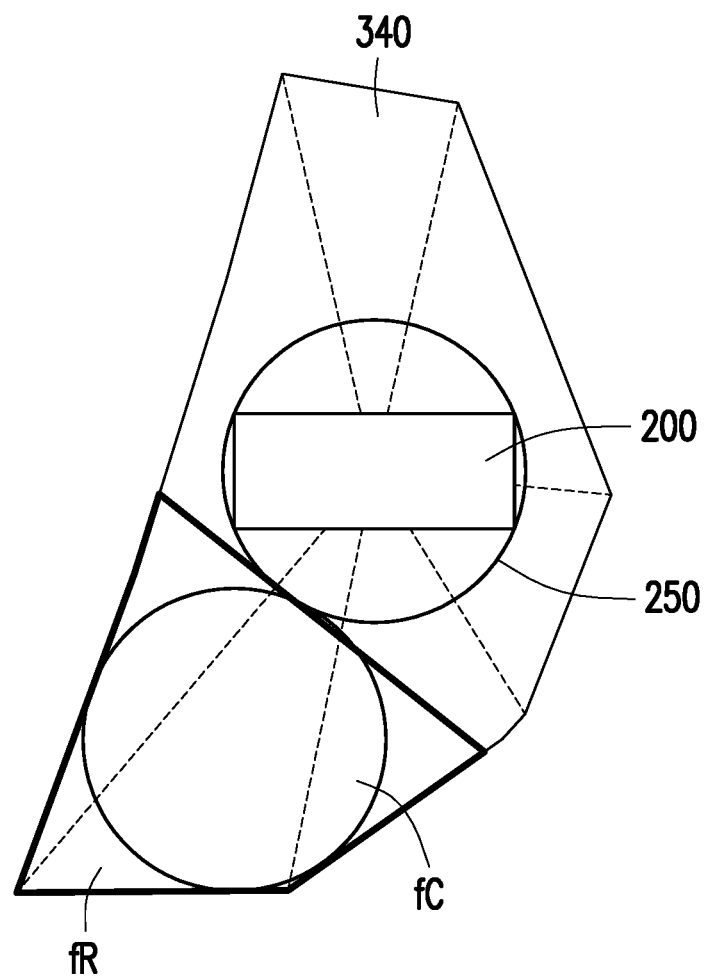
FIG. 6B is a schematic view showing a maximum circle in the enclosed region according to an embodiment of the invention.

After step S604 is completed and the plurality of enclosed regions aR, bR, cR, dR, eR, and fR as shown in FIG. 5D are generated, in step S605, the processing module 110 obtains a maximum circle in each enclosed region as one among the one or more regions mentioned in step S305 of FIG. 3. Taking the enclosed region fR as an example, FIG. 6B is a schematic view showing a maximum circle fC in the enclosed region fR according to an embodiment of the invention. The processing module 110 may obtain the maximum circle fC in the enclosed region fR as one among the one or more regions mentioned in step S305 of FIG. 3.

Figure 7A:
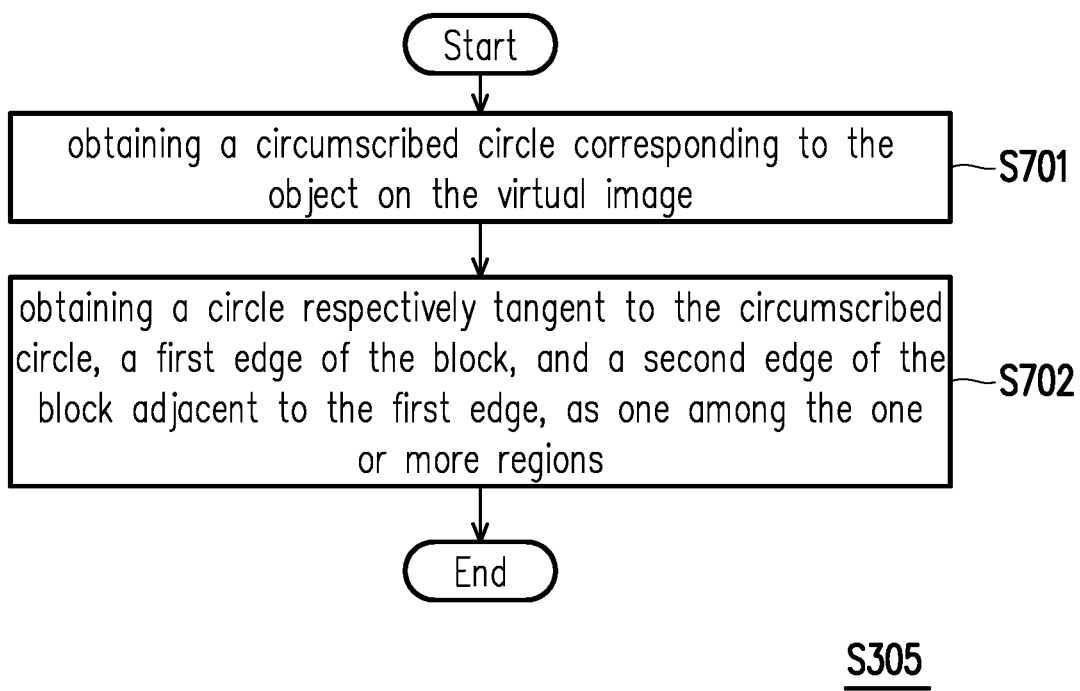
FIG. 7A is a flowchart further showing a step shown in FIG. 3 according to still another embodiment of the invention.

FIG. 7A is a flowchart further showing step S305 shown in FIG. 3 according to still another embodiment of the invention. In other words, FIG. 7A is a flowchart showing the step of dividing the block (e.g., the block 340 as shown in FIG. 2) in which the object 200 is placed into one or more regions. Step S701 is similar to step S501 as shown in FIG. 5A. Therefore, sufficient teaching, suggestion, and implementation description for the details of step S701 may be obtained according to the above description of the embodiment of FIG. 5A, which shall not be repeatedly described herein.

Figure 7B:
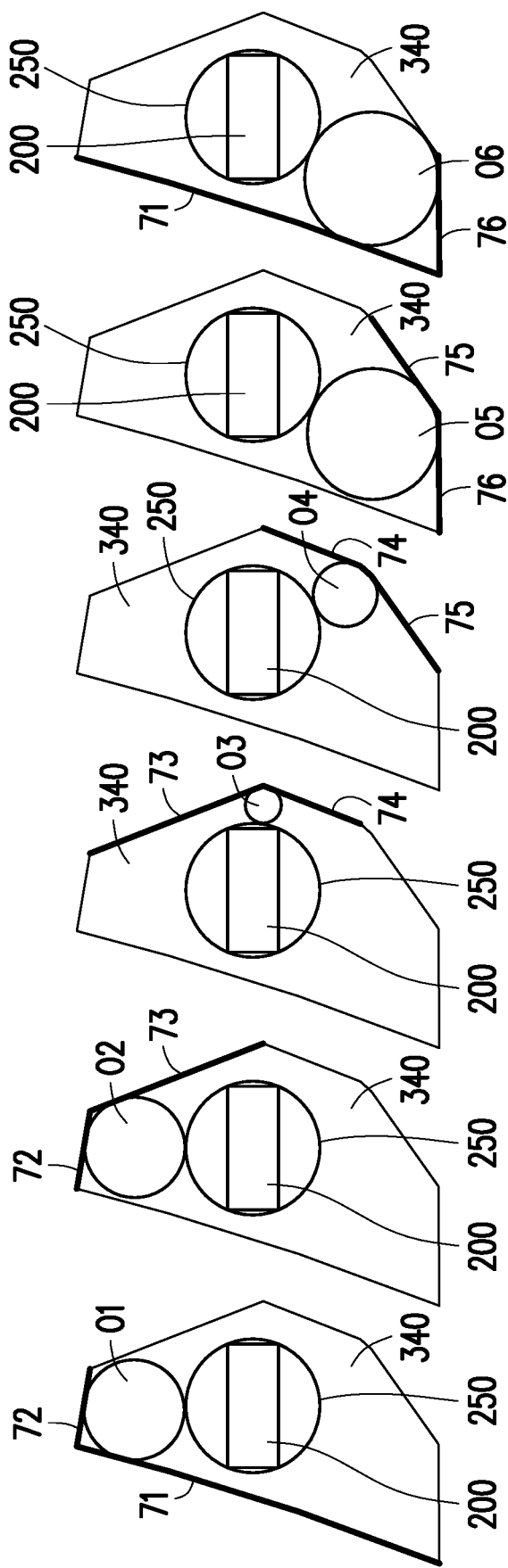
FIG. 7B is a schematic view showing circles tangent to the circumscribed circle corresponding to the object and two adjacent edges of the block according to an embodiment of the invention.

In step S702, the processing module 110 obtains a circle respectively tangent to the circumscribed circle 250, a first edge of the block 340, and a second edge of the block 340 adjacent to the first edge, as one among the one or more regions mentioned in step S305 of FIG. 3. FIG. 7B is a schematic view showing circles tangent to the circumscribed circle 250 corresponding to the object 200 and two adjacent edges of the block 340 according to an embodiment of the invention. As shown in FIG. 7B, the processing module 110 may obtain a circle O1 tangent to the circumscribed circle 250, an edge 71 of the block 340, and an edge 72 of the block 340 as one among the one or more regions. The processing module 110 may obtain a circle O2 tangent to the circumscribed circle 250, the edge 72 of the block 340, and an edge 73 of the block 340 as one among the one or more regions. The processing module 110 may obtain a circle O3 tangent to the circumscribed circle 250, the edge 73 of the block 340, and an edge 74 of the block 340 as one among the one or more regions. The processing module 110 may obtain a circle O4 tangent to the circumscribed circle 250, the edge 74 of the block 340, and an edge 75 of the block 340 as one among the one or more regions. The processing module 110 may obtain a circle O5 tangent to the circumscribed circle 250, the edge 75 of the block 340, and an edge 76 of the block 340 as one among the one or more regions. The processing module 110 may obtain a circle O6 tangent to the circumscribed circle 250, the edge 76 of the block 340, and the edge 71 of the block 340 as one among the one or more regions.

Figure 8A:
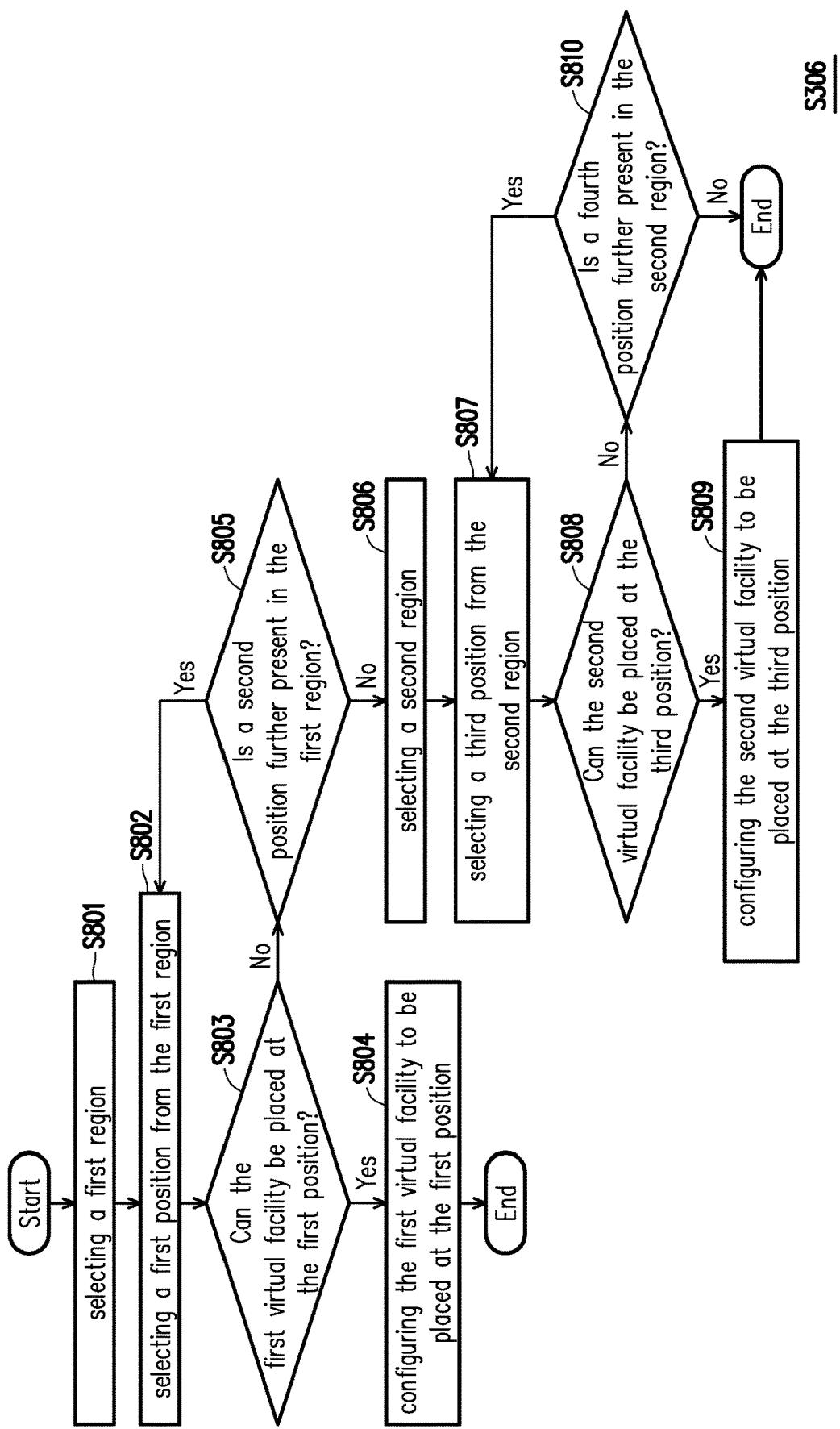
FIG. 8A is a flowchart further showing a step shown in FIG. 3 according to an embodiment of the invention.

FIG. 8A is a flowchart further showing step S306 shown in FIG. 3 according to an embodiment of the invention. In other words, FIG. 8A is a flowchart showing the step of configuring a plurality of virtual facilities corresponding to the object 200 to be placed on the one or more regions of the block 340.

In step S801, the processing module 110 selects a first region from the one or more regions of the block 340. The processing module 110 selects the first region from the one or more regions according to the area, for example. Taking the plurality of regions shown in FIG. 5D as an example, the processing module 110 may select the region fR as the first region based on the region fR being the region having the largest area among the region aR, the region bR, the region cR, the region dR, the region eR, and the region fR.

In step S802, the processing module 110 selects a first position from the first region. In an embodiment, the processing module 110 randomly selects the first position from the first region. In another embodiment, the processing module 110 selects the geometric center of the first region as the first position. For example, if the first region is the maximum circle fC as shown in FIG. 6B, the processing module 110 may select the center of the maximum circle fC as the first position.

In step S803, the processing module 110 selects a first virtual facility and determines whether the first virtual facility can be placed at the first position. Specifically, the processing module 110 may access the database in the storage medium 150 to read a plurality of virtual facilities corresponding to the object 200, and select the first virtual facility from the plurality of virtual facilities. The processing module 110 selects the first virtual facility from the plurality of virtual facilities according to the priority or the size, for example. For example, if the object 200 corresponds to the park scene, the processing module 110 may select a pavilion as the first virtual facility based on the priority of the pavilion being higher than the priority of a plurality of virtual facilities such as a slide, a swing, or a seesaw, or based on the size of the pavilion being larger than the size of a plurality of virtual facilities such as a slide, a swing, or a seesaw. After selecting the first virtual facility, the processing module 110 determines whether the first virtual facility can be placed at the first position. The processing module 110 may determine whether the first virtual facility can be placed at the first position according to a method shown in FIG. 8B.

Figure 8B:
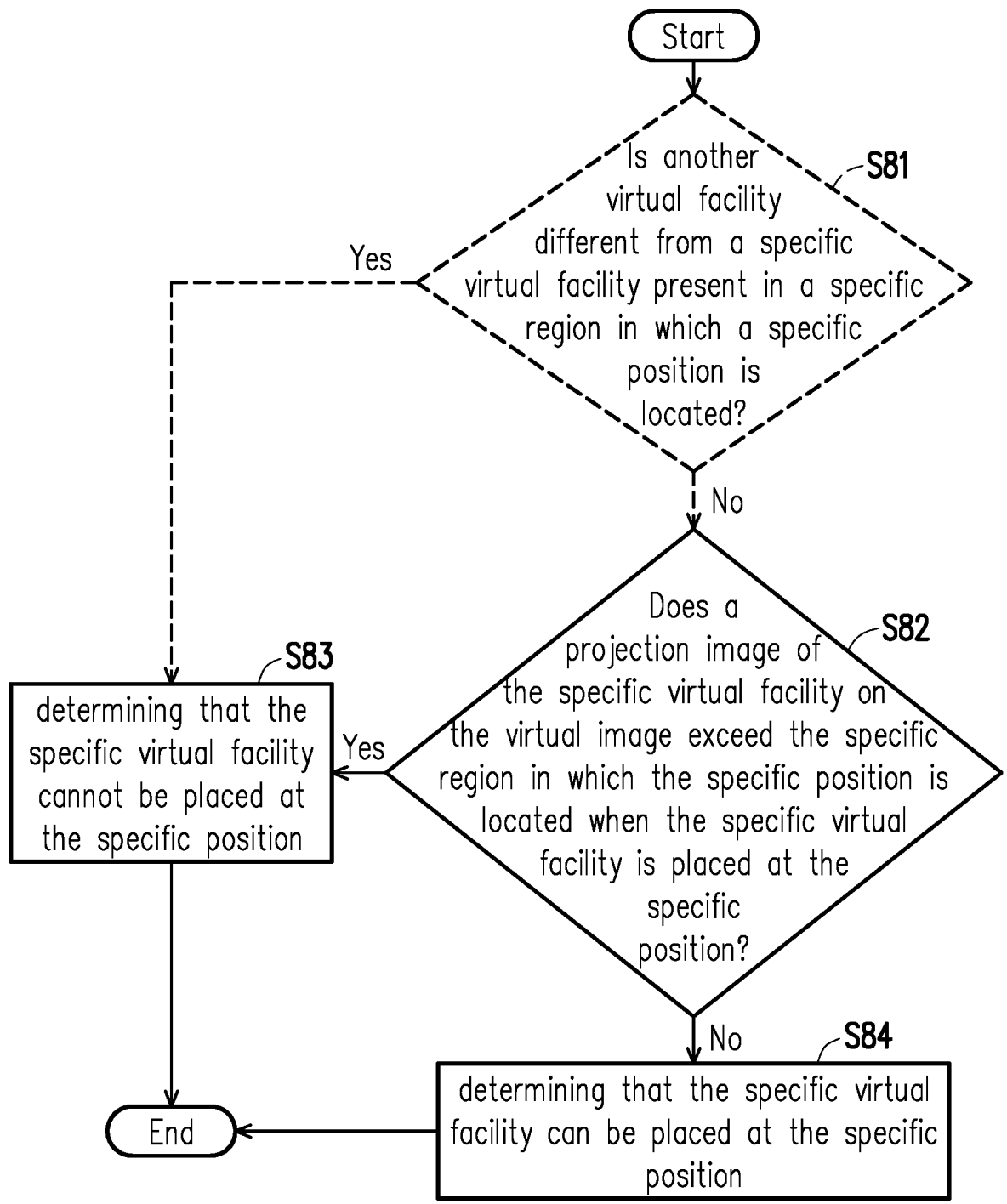
FIG. 8B is a flowchart showing step of determining whether a specific virtual facility can be placed at a specific position according to an embodiment of the invention.

FIG. 8B is a flowchart showing steps of determining whether a specific virtual facility can be placed at a specific position according to an embodiment of the invention. In step S82, the processing module 110 determines whether a projection image of a specific virtual facility on the virtual image exceeds a specific region in which a specific position is located when the specific virtual facility is placed at the specific position. If the projection image exceeds the specific region, proceeding to step S83, the processing module 110 determines that the specific virtual facility cannot be placed at the specific position. If the projection image does not exceed the specific region, proceeding to step S84, the processing module 110 determines that the specific virtual facility can be placed at the specific position. For example, assuming that the specific virtual facility is the first virtual facility as shown in step S803 of FIG. 8A, and the specific position is the first position as shown in step S803 of FIG. 8A, then in step S82, the processing module 110 may determine whether the projection image of the first virtual facility on the virtual image 300 exceeds the first region when the first virtual facility is placed at the first position. If the projection image of the first virtual facility exceeds the first region, proceeding to step S83, the processing module 110 determines that the first virtual facility cannot be placed at the first position. If the projection image does not exceed the first region, proceeding to step S84, the processing module 110 determines that the first virtual facility can be placed at the first position.

In an embodiment, the method shown in FIG. 8B further includes step S81 before step S82. In step S81, the processing module 110 determines whether another virtual facility different from the specific virtual facility is present in the specific region in which the specific position is located. If another virtual facility is present in the specific region, proceeding to step S83. If no other virtual facility is present in the specific region, proceeding to step S82. For example, assuming that the specific virtual facility is the first virtual facility as shown in step S803 of FIG. 8A, and the specific position is the first position as shown in step S803 of FIG. 8A, then in step S81, the processing module 110 may determine whether another virtual facility different from the first virtual facility is present in the first region in which the first position is located. If another virtual facility is present in the first region, proceeding to step S83. If no other virtual facility is present in the first region, proceeding to step S82.

Referring back to FIG. 8A, in step S803, if the processing module 110 determines that the first virtual facility can be placed at the first position, proceeding to step S804. If the processing module 110 determines that the first virtual facility cannot be placed at the first position, proceeding to step S805.

In step S804, the processing module 110 configures the first virtual facility to be placed at the first position.

In step S805, the processing module 110 determines whether a second position different from the first position is further present in the first region. If a second position is further present, returning to step S802, the processing module 110 selects the second position from the first region as a new first position, and then determines in step S803 whether the first virtual facility can be placed at the new first position. If the second position is not present, proceeding to step S806.

In step S806, the processing module 110 selects a second region different from the first region from the one or more regions of the block 340. The processing module 110 selects the second region from the one or more regions according to the area, for example. Taking the plurality of regions shown in FIG. 5D as an example, the processing module 110 may select the region eR as the second region based on the region eR being the region having the largest area among the region aR, the region bR, the region cR, the region dR, and the region eR.

In step S807, the processing module 110 selects a third position from the second region. In an embodiment, the processing module 110 randomly selects the third position from the second region. In another embodiment, the processing module 110 selects the geometric center of the second region as the third position.

In step S808, the processing module 110 selects a second virtual facility different from the first virtual facility and determines whether the second virtual facility can be placed at the third position. Specifically, the processing module 110 may access the database in the storage medium 150 to read a plurality of virtual facilities corresponding to the object 200, and select the second virtual facility different from the first virtual facility from the plurality of virtual facilities. The processing module 110 selects the second virtual facility from the plurality of virtual facilities according to the priority or the size, for example. The processing module 110 may determine whether the second virtual facility can be placed at the third position according to the method as shown in FIG. 8B. If the processing module 110 determines that the second virtual facility can be placed at the third position, proceeding to step S809. If the processing module 110 determines that the second virtual facility cannot be placed at the third position, proceeding to step S810.

In step S809, the processing module 110 configures the second virtual facility to be placed at the third position.

In step S810, the processing module 110 determines whether a fourth position different from the third position is further present in the second region. If a fourth position is further present, returning to step S807, the processing module 110 selects the fourth position from the second region as a new third position, and then determines in step S808 whether the second virtual facility can be placed at the new third position. If the fourth position is not present, the process of FIG. 8A is ended.

Based on the steps as shown in FIG. 8A, the processing module 110 will automatically generate the corresponding virtual facilities in the virtual scene. Without taking effort to design the virtual scene, the user can obtain a virtual scene having a different virtual facility configuration each time the user uses the interactive projection system 10.

Figure 9:
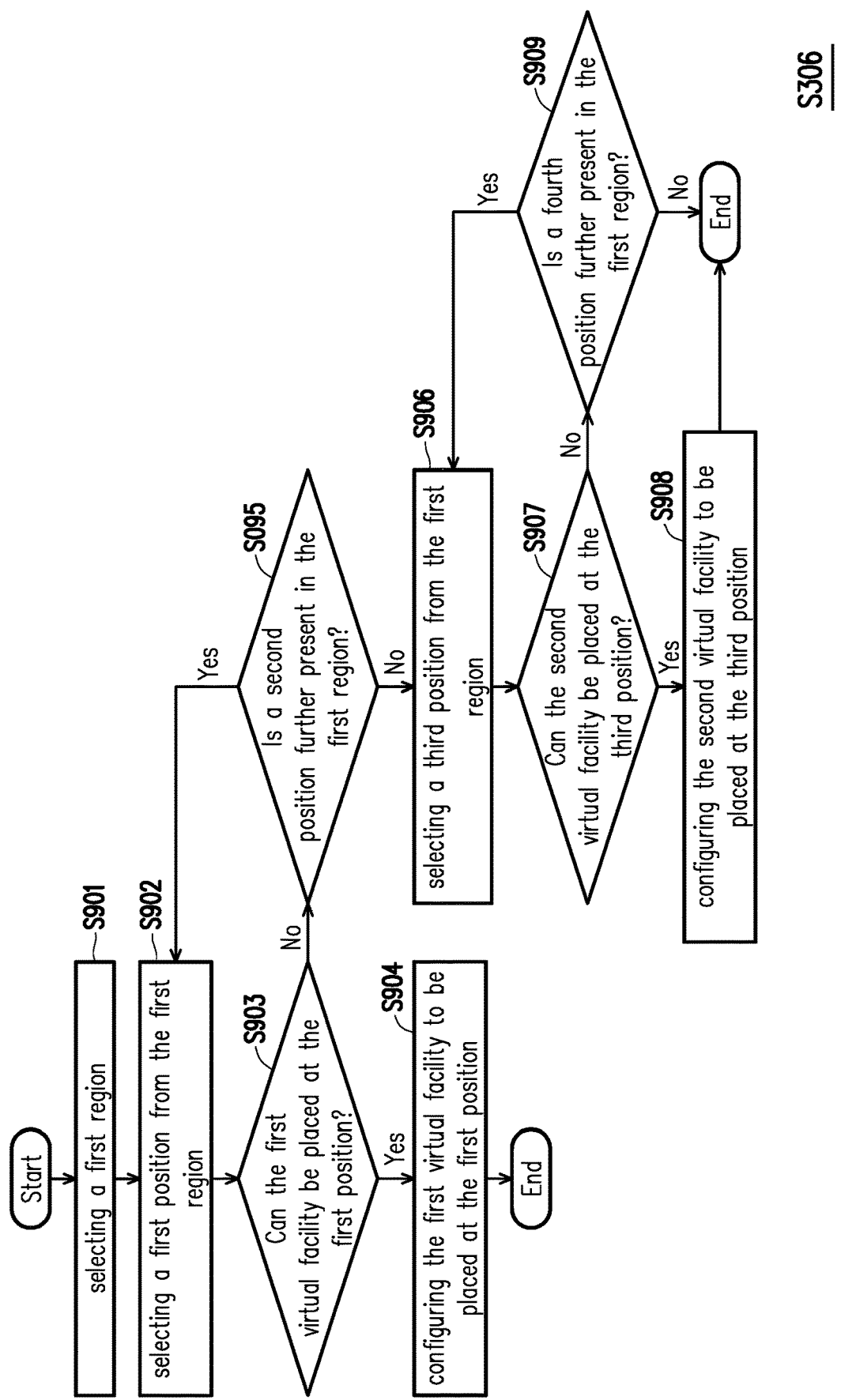
FIG. 9 is a flowchart further showing a step shown in FIG. 3 according to another embodiment of the invention.

FIG. 9 is a flowchart further showing step S306 shown in FIG. 3 according to another embodiment of the invention. In other words, FIG. 9 is a flowchart showing the step of configuring the plurality of virtual facility corresponding to the object 200 to be placed on the one or more regions of the block 340.

In step S901, the processing module 110 selects a first region from the one or more regions of the block 340. The processing module 110 selects the first region from the one or more regions according to the area, for example.

In step S902, the processing module 110 selects a first position from the first region. In an embodiment, the processing module 110 randomly selects the first position from the first region. In another embodiment, the processing module 110 selects the geometric center of the first region as the first position.

In step S903, the processing module 110 selects a first virtual facility and determines whether the first virtual facility can be placed at the first position. If the processing module 110 determines that the first virtual facility can be placed at the first position, proceeding to step S904. If the processing module 110 determines that the first virtual facility cannot be placed at the first position, proceeding to step S905.

In step S904, the processing module 110 configures the first virtual facility to be placed at the first position.

In step S905, the processing module 110 determines whether a second position different from the first position is further present in the first region. If a second position is further present, returning to step S902, the processing module 110 selects the second position from the first region as a new first position, and then determines in step S903 whether the first virtual facility can be placed at the new first position. If the second position is not present, proceeding to step S906.

In step S906, the processing module 110 selects a third position from the first region. In an embodiment, the processing module 110 randomly selects the third position from the first region. In another embodiment, the processing module 110 selects the geometric center of the first region as the third position. The third position may be the same as or different from the first position (or the new first position) as shown in step S902.

In step S907, the processing module 110 selects a second virtual facility different from the first virtual facility and determines whether the second virtual facility can be placed at the third position. If the processing module 110 determines that the second virtual facility can be placed at the third position, proceeding to step S908. If the processing module 110 determines that the second virtual facility cannot be placed at the third position, proceeding to step S909.

In step S908, the processing module 110 configures the second virtual facility to be placed at the third position.

In step S909, the processing module 110 determines whether a fourth position different from the third position is further present in the first region. If a fourth position is further present, returning to step S906, the processing module 110 selects the fourth position from the first region as a new third position, and then determines in step S907 whether the second virtual facility can be placed at the new third position. If the fourth position is not present, the process of FIG. 9 is ended.

Based on the steps as shown in FIG. 9, the processing module 110 will automatically generate the corresponding virtual facilities in the virtual scene. Without taking effort to design the virtual scene, the user can obtain a virtual scene having a different virtual facility configuration each time the user uses the interactive projection system 10.

Figure 10:
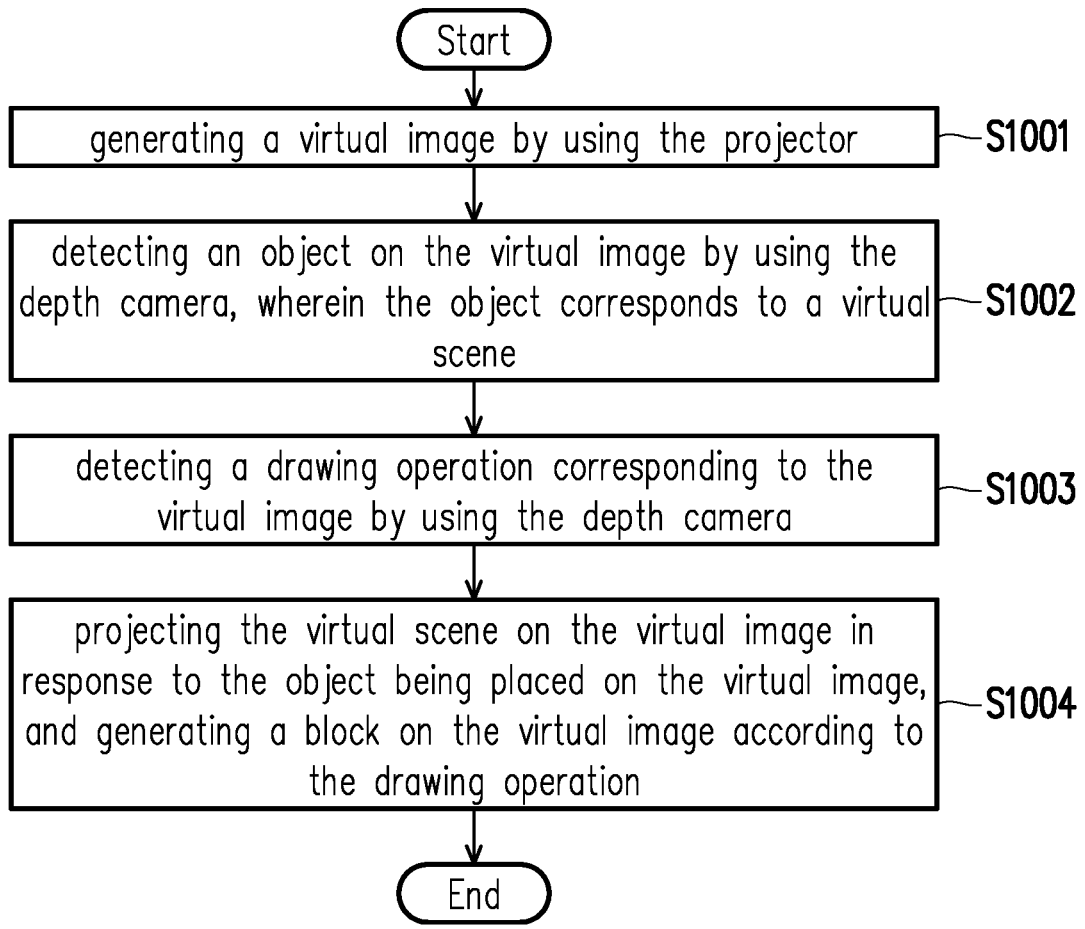
FIG. 10 is a flowchart showing another interactive projection method according to an embodiment of the invention.

FIG. 10 is a flowchart showing another interactive projection method according to an embodiment of the invention. The interactive projection method may be implemented by the interactive projection system 10 as shown in FIG. 1A. In step S1001, a virtual image is generated by using the projector. In step S1002, an object on the virtual image is detected by using the depth camera, and the object corresponds to a virtual scene. In step S1003, a drawing operation corresponding to the virtual image is detected by using the depth camera. In step S1004, the virtual scene is projected on the virtual image in response to the object being placed on the virtual image, and a block is generated on the virtual image according to the drawing operation.

In summary of the above, the interactive projection system of the invention can detect an object placed on a virtual image and select a projected image accordingly. First, the user may create a path and divide multiple blocks on the virtual image through a simple drawing operation. Next, by placing the object, the user can quickly build a virtual scene corresponding to the placed object in each block. The interactive projection system may further automatically build various virtual facilities in the virtual scene. By using a plurality of objects respectively corresponding to different virtual scenes, the user can create a personalized virtual town on the virtual image. The interactive projection system may provide the user with a fun, life-relevant, and immersed user experience.

Although the invention has been disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An interactive projection system, comprising:
an object, corresponding to a virtual scene; and
a projector, comprising:
a light source module, providing an illumination beam;
a projection lens module, converting the illumination beam into an image beam and projecting the image beam to generate a virtual image;
a depth camera, detecting the object on the virtual image and a drawing operation corresponding to the virtual image;
a storage medium, storing a database associated with the virtual scene; and
a processing module, coupled to the light source module, the projection lens module, the depth camera, and the storage medium, wherein the processing module accesses the database in response to the object being placed on the virtual image and projects the virtual scene on the virtual image through the projection lens module, and the processing module generates a block on the virtual image according to the drawing operation,
wherein the block comprises a first region and a second region, the processing module selects a first position from the first region, and the processing module determines whether a first virtual facility can be placed at the first position.

2. The interactive projection system according to claim 1, wherein the processing module determines a line segment drawn by the drawing operation as a path in response to formation of an enclosed block by the line segment and an existing line segment on the virtual image, and the processing module generates the block according to the path.

3. The interactive projection system according to claim 2, wherein the processing module determines the enclosed block as the block based on an area of the enclosed block being larger than an area threshold value.

4. The interactive projection system according to claim 1, wherein the processing module selects a second position different from the first position from the first region in response to the first virtual facility not being placeable at the first position, and the processing module determines whether the first virtual facility can be placed at the second position.

5. The interactive projection system according to claim 4, wherein the processing module places the first virtual facility in the second region in response to the first virtual facility not being placeable at the second position.

6. The interactive projection system according to claim 4, wherein the processing module selects a third position from the first region in response to the first virtual facility not being placeable at the second position, and the processing module determines whether a second virtual facility different from the first virtual facility can be placed at the third position.

7. The interactive projection system according to claim 1, wherein the processing module is configured to:
obtain a circumscribed circle corresponding to the object on the virtual image;
connect a center of the circumscribed circle to a plurality of vertices of the block to generate a plurality of tangent points of the circumscribed circle;
obtain a plurality of tangent lines of the circumscribed circle respectively corresponding to the plurality of tangent points; and
generate a plurality of enclosed regions comprising the first region by using the plurality of tangent lines and a plurality of edges of the block.

8. The interactive projection system according to claim 1, wherein the processing module is configured to:
   obtain a circumscribed circle corresponding to the object on the virtual image;
   connect a center of the circumscribed circle to a plurality of vertices of the block to generate a plurality of tangent points of the circumscribed circle;
   obtain a plurality of tangent lines of the circumscribed circle respectively corresponding to the plurality of tangent points;
   generate a plurality of enclosed regions comprising a first enclosed region by using the plurality of tangent lines and a plurality of edges of the block; and
   obtain a maximum circle in the first enclosed region as the first region.

9. The interactive projection system according to claim 1, wherein the processing module is configured to:
   obtain a circumscribed circle corresponding to the object on the virtual image; and
   obtain a circle as the first region, wherein the first region is respectively tangent to the circumscribed circle, a first edge of the block, and a second edge of the block adjacent to the first edge.

10. The interactive projection system according to claim 1, wherein the processing module determines that the first virtual facility cannot be placed at the first position in the first region in response to presence of another virtual facility in the first region.

11. The interactive projection system according to claim 1, wherein the processing module determines that the first virtual facility cannot be placed at the first position in response to a projection image of the first virtual facility on the virtual image exceeding the first region when the first virtual facility is placed at the first position.

12. The interactive projection system according to claim 1, wherein the processing module randomly selects the first position from the first region.

13. The interactive projection system according to claim 1, wherein the processing module selects a geometric center of the first region as the first position.

14. An interactive projection method, comprising:
   generating a virtual image by using a projector;
   detecting an object on the virtual image by using a depth camera, wherein the object corresponds to a virtual scene;
   detecting a drawing operation corresponding to the virtual image by using the depth camera;
   projecting the virtual scene on the virtual image in response to the object being placed on the virtual image, and generating a block on the virtual image according to the drawing operation, wherein the block comprises a first region and a second region;
   selecting a first position from the first region; and
   determining whether a first virtual facility can be placed at the first position.

15. The interactive projection method according to claim 14, further comprising:
   determining a line segment drawn by the drawing operation as a path in response to formation of an enclosed block by the line segment and an existing line segment on the virtual image; and
   generating the block according to the path.

16. The interactive projection method according to claim 15, further comprising:
   determining the enclosed block as the block based on an area of the enclosed block being larger than an area threshold value.

17. The interactive projection method according to claim 14, further comprising:
   selecting a second position different from the first position from the first region in response to the first virtual facility not being placeable at the first position; and
   determining whether the first virtual facility can be placed at the second position.

18. The interactive projection method according to claim 17, further comprising:
   placing the first virtual facility in the second region in response to the first virtual facility not being placeable at the second position.

19. The interactive projection method according to claim 17, further comprising:
   selecting a third position from the first region in response to the first virtual facility not being placeable at the second position; and
   determining whether a second virtual facility different from the first virtual facility can be placed at the third position.

20. The interactive projection method according to claim 14, further comprising:
   obtaining a circumscribed circle corresponding to the object on the virtual image;
   connecting a center of the circumscribed circle to a plurality of vertices of the block to generate a plurality of tangent points of the circumscribed circle;
   obtaining a plurality of tangent lines of the circumscribed circle respectively corresponding to the plurality of tangent points; and
   generating a plurality of enclosed regions comprising the first region by using the plurality of tangent lines and a plurality of edges of the block.

21. The interactive projection method according to claim 14, further comprising:
   obtaining a circumscribed circle corresponding to the object on the virtual image;
   connecting a center of the circumscribed circle to a plurality of vertices of the block to generate a plurality of tangent points of the circumscribed circle;
   obtaining a plurality of tangent lines of the circumscribed circle respectively corresponding to the plurality of tangent points;
   generating a plurality of enclosed regions comprising a first enclosed region by using the plurality of tangent lines and a plurality of edges of the block; and
   obtaining a maximum circle in the first enclosed region as the first region.

22. The interactive projection method according to claim 14, further comprising:
   obtaining a circumscribed circle corresponding to the object on the virtual image; and
   obtaining a circle as the first region, wherein the first region is respectively tangent to the circumscribed circle, a first edge of the block, and a second edge of the block adjacent to the first edge.

23. The interactive projection method according to claim 14, further comprising:
   determining that the first virtual facility cannot be placed at the first position in the first region in response to presence of another virtual facility in the first region.

24. The interactive projection method according to claim 14, further comprising:
   determining that the first virtual facility cannot be placed at the first position in response to a projection image of the first virtual facility on the virtual image exceeding the first region when the first virtual facility is placed at the first position.

25. The interactive projection method according to claim 14, further comprising:
randomly selecting the first position from the first region.

26. The interactive projection method according to claim 14, further comprising:
selecting a geometric center of the first region as the first position.

* * * * *